United States Patent
Kwon et al.

(10) Patent No.: US 8,852,815 B2
(45) Date of Patent: Oct. 7, 2014

(54) ELECTROLYTE FOR ELECTROCHEMICAL DEVICE, METHOD FOR PREPARING THE SAME AND ELECTROCHEMICAL DEVICE INCLUDING THE SAME

(71) Applicant: LG Chem, Ltd., Seoul (KR)

(72) Inventors: Yo-Han Kwon, Daejeon (KR); Je-Young Kim, Daejeon (KR); Byung-Hun Oh, Daejeon (KR); Ki-Tae Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/936,967

(22) Filed: Jul. 8, 2013

(65) Prior Publication Data

US 2013/0295466 A1 Nov. 7, 2013

Related U.S. Application Data

(63) Continuation of application No. PCT/KR2011/008023, filed on Oct. 26, 2011.

(30) Foreign Application Priority Data

Jan. 20, 2011 (KR) .......................... 10-2011-0006006

(51) Int. Cl.
*H01M 6/18* (2006.01)
*H01M 10/0562* (2010.01)

(52) U.S. Cl.
USPC .......................................... 429/306; 429/304

(58) Field of Classification Search
None
See application file for complete search history.

(56) References Cited

U.S. PATENT DOCUMENTS

2002/0132169 A1  9/2002  Yamamoto et al.
2009/0092902 A1  4/2009  Abouimrane et al.
(Continued)

FOREIGN PATENT DOCUMENTS

JP  2001-93575 A  4/2001
JP  2004-134172 A  4/2004
(Continued)

OTHER PUBLICATIONS

Yoshimoto, et. al., Ionic conductance behavior of polymeric electrolytes containing magnesium salts and their application to rechargeable batteries, Solid State Ionics, 152-153 (2002), 259-266.*
Fan et al., "Enhanced ionic conductivities in composite polymer electrolytes by using succinonitrile as a plasticizer", Solid State Ionics, 179, (2006). pp. 1772-1775.
(Continued)

*Primary Examiner* — Cynthia K. Walls
(74) *Attorney, Agent, or Firm* — Birch, Stewart, Kolasch & Birch, LLP

(57) ABSTRACT

A solid electrolyte for an electrochemical device includes a composite of a plastic crystal matrix electrolyte doped with an ionic salt and a crosslinked polymer structure having a linear polymer as a side chain chemically bonded thereto. The linear polymer has a weight average molecular weight of 100 to 5,000 and one functional group. The electrolyte has high ionic conductivity comparable to that of a liquid electrolyte due to the use of the plastic crystal, and high mechanical strength comparable to that of a solid electrolyte due to the introduction of the crosslinked polymer structure. A method for preparing the solid electrolyte does not essentially require the use of a solvent, eliminating the need for drying. The electrolyte is suitable for use in a cable-type battery whose shape is easy to change due to its high ionic conductivity and high mechanical strength comparable to that of a solid electrolyte.

22 Claims, 2 Drawing Sheets

(56) References Cited

U.S. PATENT DOCUMENTS

| | | |
|---|---|---|
| 2010/0069667 A1 | 3/2010 | Hajime et al. |
| 2010/0119951 A1 | 5/2010 | Abouimrane et al. |
| 2012/0094187 A1 | 4/2012 | Kwon et al. |
| 2012/0115040 A1 | 5/2012 | Kwon et al. |

FOREIGN PATENT DOCUMENTS

| | | |
|---|---|---|
| JP | 2007-106875 A | 4/2007 |
| JP | 2008-204858 A | 9/2008 |
| JP | 2009-503769 A | 1/2009 |
| JP | 2013-528920 A | 7/2013 |
| JP | 2013-532360 A | 8/2013 |
| KR | 10-1998-0040038 A | 8/1998 |
| KR | 10-1998-0057628 A | 9/1998 |
| WO | 2008/081811 A1 | 7/2008 |

OTHER PUBLICATIONS

Macfarlane et al., "Plastic Crystal Electrolyte Materials: New Perspective on Solid State Ionics", Adv. Mater. 13, No. 12-13, Jul. 4, 2001. pp. 957-965.

PCT/ISA/210—International Search Report mailed on May 24, 2012, issued in PCT/KR2011/008023.

PCT/ISA/237—mailed on May 24, 2012, issued in PCT/KR2011/008023.

Abouimrane et al., "Plastic Crystal-Lithium Batteries: An Effective Ambient Temperature All-Solid-State Power Source", Journal of the Electrochemical Society, vol. 151, No. 7, 2004, pp. A1028-A1031.

Fan et al., "Composite effects in poly(ethylene oxide)-succinonitrile based all-solid electrolytes", Electrochemistry Communications, vol. 8, 2006 (Published online at www.sciencedirect.com), pp. 1753-1756.

\* cited by examiner

ELECTROLYTE FOR ELECTROCHEMICAL DEVICE, METHOD FOR PREPARING THE SAME AND ELECTROCHEMICAL DEVICE INCLUDING THE SAME

CROSS-REFERENCE TO RELATED APPLICATION

This application is a continuation of International Application No. PCT/KR2011/008023 filed on Oct. 26, 2011, which claims priorities to Korean Patent Application No. 10-2011-0006006 filed in the Republic of Korea on Jan. 20, 2011, the entire contents of which are incorporated herein by reference.

TECHNICAL FIELD

The present disclosure relates to an electrolyte for an electrochemical device, a method for preparing the electrolyte, and an electrochemical device including the electrolyte. More specifically, the present disclosure relates to a plastic crystal matrix electrolyte.

BACKGROUND ART

Secondary batteries are representative electrochemical devices in which external electrical energy converted into chemical energy is stored and created into electricity when necessary. Secondary batteries are also called "rechargeable batteries," because they are capable of repeated charge and discharge. Lead-acid batteries, nickel cadmium (NiCd) batteries, nickel metal hydride (NiMH) batteries, lithium ion batteries and lithium ion polymer batteries are frequently used as secondary batteries. Secondary batteries offer economic and environmental advantages over primary batteries that are disposed of after energy stored therein has been exhausted.

Secondary batteries are currently used in applications where low power is needed, for example, devices for assisting in the starting of car engines, portable devices, instruments and uninterrupted power supply systems. Recent developments in wireless communication technologies have led to the popularization of portable devices and have brought about a tendency to connect many kinds of existing devices to wireless networks. Under such circumstances, demand for secondary batteries is growing explosively. Hybrid automobiles and electric automobiles have been put into practical use for the purpose of preventing environmental pollution. These next-generation automobiles reduce costs and weight and increase their life span by employing technologies based on secondary batteries.

Generally, most secondary batteries are cylindrical, prismatic or pouch type in shape depending on the fabrication process thereof. That is, a secondary battery is typically fabricated by inserting an electrode assembly composed of an anode, a cathode and a separator into a cylindrical or prismatic metal can or a pouch-type case made of an aluminum laminate sheet, and injecting an electrolyte into the electrode assembly. Accordingly, the cylindrical, prismatic or pouch-type secondary battery requires a certain space for assembly, which is an obstacle to the development of various types of portable devices. Thus, there is a need for a novel type of secondary battery whose shape is easy to change, and particularly, an electrolyte suitable for use in the secondary battery that has high ionic conductivity without any risk of leakage.

Ionically conductive organic electrolytes in the form of liquids in which salts are dissolved in non-aqueous organic solvents have predominantly been used in conventional electrochemical devices based on electrochemical reactions. However, the use of such electrolytes in the form of liquids causes degradation of electrode materials, increases the possibility of evaporation of organic solvents, and poses safety problems, such as fire resulting from high surrounding temperatures and increased battery temperatures. There are other problems, such as a risk of leakage and a difficulty in realizing various types of electrochemical devices. In attempts to overcome the safety problems of such liquid electrolytes, polymer electrolytes have been proposed, such as gel polymer electrolytes and solid polymer electrolytes. It is generally known that the safety of electrochemical devices increases in the order of liquid electrolytes, gel polymer electrolytes and solid polymer electrolytes, but the performance thereof decreases in the same order. Electrochemical devices employing solid polymer electrolytes are not yet commercialized, to our knowledge, because of their inferior performance. Gel polymer electrolytes have low ionic conductivity, suffer from the risk of leakage and possess poor mechanical properties compared to liquid electrolytes.

Korean Unexamined Patent Publication No. 2008-33421 discloses an electrolyte using a plastic crystal matrix instead of a liquid organic solvent. The electrolyte exhibits ionic conductivity comparable to that of a liquid electrolyte. However, the electrolyte exhibits very poor mechanical properties due to its flowability similar to that of liquid. In actuality, a separator is required to prevent short circuits in a battery using the electrolyte. In some cases, the introduction of linear polymer matrices, such as polyethylene oxide, is considered to improve the mechanical strength of plastic crystal matrix electrolytes. In these cases as well, the electrolytes do not possess mechanical properties sufficient to negate the need for separators. Drying is necessary to remove solvents used to dissolve the linear polymers, rendering the process complicated.

Thus, there is an urgent need to develop a solid electrolyte using a plastic crystal matrix electrolyte that has improved mechanical properties while maintaining high ionic conductivity of the plastic crystal matrix electrolyte.

DISCLOSURE

Technical Problem

The present disclosure is designed to solve the problems of the prior art, and therefore it is an object of the present disclosure to provide a plastic crystal matrix electrolyte that has high ionic conductivity and can ensure mechanical strength, and a method for preparing the electrolyte.

Technical Solution

According to an aspect of the present disclosure, there is provided an electrolyte for an electrochemical device, including a composite of a plastic crystal matrix electrolyte doped with an ionic salt and a crosslinked polymer structure having a linear polymer as a side chain chemically bonded thereto wherein the linear polymer has a weight average molecular weight of 100 to 5,000 and one functional group. The composite may further include a linear polymer having no functional group.

The electrolyte of the present disclosure may include 40 to 90% by weight of the plastic crystal matrix electrolyte doped with an ionic salt. As the plastic crystal matrix, there may be used, for example, succinonitrile.

The ionic salt is preferably a lithium salt. Examples of lithium salts suitable for use as the ionic salt include lithium bis(trifluoromethanesulfonyl)imide, lithium bis(perfluoroethylsulfonyl)imide and lithium tetrafluoroborate.

As the linear polymer having a weight average molecular weight of 100 to 5,000 and one functional group, there may be used, for example, polyethylene glycol methacrylate, polyethylene glycol acrylate, polyethylene glycol methyl ether acrylate or polyethylene glycol methyl ether methacrylate.

The crosslinked polymer structure may be a polymer of a monomer having two or more functional groups. As the monomer having two or more functional groups, there may be used, for example, trimethylolpropane ethoxylate triacrylate, polyethylene glycol dimethacrylate, polyethylene glycol diacrylate, divinyl benzene, polyester dimethacrylate, divinyl ether, trimethylolpropane trimethacrylate or ethoxylated bisphenol A dimethacrylate.

As the linear polymer having no functional group that is optionally included in the electrolyte of the present disclosure, there may be used, for example, polyethylene oxide, polypropylene oxide, polyoxymethylene, polydimethylsiloxane, polyacrylonitrile, polymethyl methacrylate, polyvinyl chloride, polyvinylidene fluoride, polyvinylidene fluoride-co-hexafluoropropylene, polyethyleneimine, poly(p-phenylene terephthalamide), poly(methoxy polyethylene glycol methacrylate) and poly(2-methoxyethyl glycidyl ether).

According to another aspect of the present disclosure, there is provided a method for preparing the electrolyte, the method including: mixing a plastic crystal matrix electrolyte doped with an ionic salt, a monomer having two or more functional groups, and a linear polymer having a weight average molecular weight of 100 to 5,000 and one functional group to prepare a solution; and polymerizing the monomer in the solution.

Advantageous Effects

The electrolyte of the present disclosure has high ionic conductivity comparable to that of a liquid electrolyte due to the use of the plastic crystal, and high mechanical strength comparable to that of a solid electrolyte due to the introduction of the crosslinked polymer structure. In addition, the method of the present disclosure does not essentially require the use of a solvent, eliminating the need for drying. Therefore, the electrolyte of the present disclosure can be prepared in a simple manner. The electrolyte of the present disclosure is suitable for use in a cable-type battery whose shape is easy to change due to its high ionic conductivity and high mechanical strength comparable to that of a solid electrolyte.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

EXPLANATION OF REFERENCE NUMERALS

10: Crosslinked structure
20: Linear polymer having a weight average molecular weight of 100 to 5,000 and one functional group
30: Linear polymer having no functional group

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The present disclosure provides an electrolyte for an electrochemical device, including a composite of a plastic crystal matrix electrolyte doped with an ionic salt and a crosslinked polymer structure having a linear polymer with a weight average molecular weight of 100 to 5,000 as a side chain chemically bonded thereto.

The electrolyte of the present disclosure serves as a medium that transports lithium ions between a cathode and an anode.

The plastic crystal is a compound whose molecules or ions exhibit rotational disorder but whose center of gravity occupies a position aligned in the crystal lattice structure. The rotational phase of the plastic crystal is generally created by a solid-to-solid transition at a temperature not higher than the melting point. As a result of the solid-to-solid transition, the plastic crystal exhibits plastic properties, mechanical flowability and high conductivity. Particularly, doping with an ionic salt leads to high ionic conductivity, making the plastic crystal suitable for use in an electrolyte for a secondary battery. However, flowability of the plastic crystal matrix electrolyte is disadvantageous in terms of mechanical properties. To overcome this disadvantage, the crosslinked polymer structure, to which a linear polymer having a weight average molecular weight of 100 to 5,000 and one functional group as a side chain is chemically bonded, is introduced into the plastic crystal matrix electrolyte.

Figure 1:
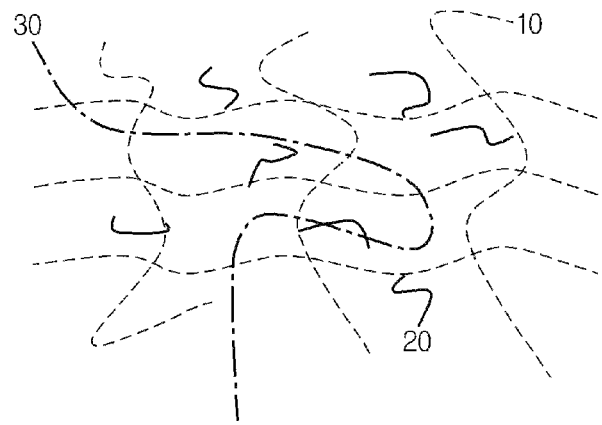
FIG. 1 is a schematic diagram of a solid electrolyte according to an embodiment of the present disclosure.

A solid electrolyte according to an embodiment of the present disclosure is schematically illustrated in FIG. 1. Referring to this figure, a crosslinked polymer structure 10 has a three-dimensional structure due to chemical bonding between molecular chains thereof, unlike linear polymers. This three-dimensional structure compensates for the flowability of a plastic crystal matrix electrolyte. In addition, since such crosslinking protects the crosslinked polymer structure from thermal deformation, the electrolyte of the present disclosure is not softened even when heat is applied thereto, ensuring thermal stability. Particularly, the crosslinked polymer structure 10 has a linear polymer having a weight average molecular weight of 100 to 5,000 and one functional group as a side chain chemically bonded thereto. The linear polymer 20 having a weight average molecular weight of 100 to 5,000 and one functional group as a side chain brings about effective and easy hopping of lithium ions migrating via the hopping mechanism to impart ionic conductivity to the crosslinked polymer structure. That is, the introduction of the linear polymer 20 having a weight average molecular weight of 100 to 5,000 and one functional group improves the chain mobility of the crosslinked polymer structure, which further facilitates the migration of ions, contributing to improvement of ionic conductivity.

As the linear polymer 20 having a weight average molecular weight of 100 to 5,000 and one functional group, there may be used, for example, polyethylene glycol methacrylate, polyethylene glycol methyl ether acrylate or polyethylene glycol methyl ether methacrylate.

The electrolyte of the present disclosure is a composite of a plastic crystal matrix electrolyte doped with an ionic salt and the crosslinked polymer structure having the linear polymer as a side chain chemically bonded thereto. The composite may be prepared by homogeneously mixing a monomer having two or more crosslinkable functional groups and a plastic crystal matrix electrolyte doped with an ionic salt, and polymerizing the monomer to form the crosslinked polymer structure. The crosslinked polymer structure contributes to an improvement in the mechanical properties of the electrolyte to impart the electrolyte with mechanical properties comparable to that of a solid electrolyte. The uniform distribution of the plastic crystal matrix electrolyte increases the ionic conductivity of the electrolyte.

The electrolyte of the present disclosure may be a composite which further includes a linear polymer 30 having no functional group. Due to high mobility of the linear polymer 30 chain having no functional group, the electrolyte including the optional linear polymer is more flexible and has higher ionic conductivity than the composite including only the crosslinked polymer structure 10. It should be interpreted to mean that the composite may include a branched polymer in addition to the linear polymer 30 having no functional group. As the linear polymer, there may be used, for example, polyethylene oxide, polypropylene oxide, polyoxymethylene, polydimethylsiloxane, polyacrylonitrile, polymethyl methacrylate, polyvinyl chloride, polyvinylidene fluoride, polyvinylidene fluoride-co-hexafluoropropylene, polyethyleneimine or poly(p-phenylene terephthalamide). Examples of branched polymers that can be combined with the linear polymer include poly(methoxy polyethylene glycol methacrylate) and poly(2-methoxyethyl glycidyl ether).

The solid electrolyte of the present disclosure may include 40 to 90% by weight of the plastic crystal matrix electrolyte doped with an ionic salt.

The crosslinked polymer structure is preferably a polymer of a monomer having two or more functional groups. The monomer having two or more functional groups is intended to include not only monomers but also polymers with a low degree of polymerization consisting of 2 to 20 repeating units. The kind of the monomer having two or more functional groups is not limited, and examples thereof include trimethylolpropane ethoxylate triacrylate, polyethylene glycol dimethacrylate, polyethylene glycol diacrylate, divinyl benzene, polyester dimethacrylate, divinyl ether, trimethylolpropane, trimethylolpropane trimethacrylate and ethoxylated bisphenol A dimethacrylate.

There is no restriction on the kind of the plastic crystal matrix. Succinonitrile is preferably used as the plastic crystal matrix.

The ionic salt doped into the plastic crystal matrix electrolyte is preferably a lithium salt. Examples of lithium salts suitable for use as the ionic salt include lithium bis(trifluoromethanesulfonyl)imide, lithium bis(perfluoroethylsulfonyl)imide and lithium tetrafluoroborate.

Particularly, the effects of the present disclosure can be further enhanced when polyethylene glycol methacrylate, polyethylene glycol dimethacrylate and polyethylene oxide having similar chemical structures are used.

The present disclosure also provides a method for preparing an electrolyte including a composite of a plastic crystal matrix electrolyte doped with an ionic salt and a crosslinked polymer structure having a linear polymer as a side chain chemically bonded thereto wherein the linear polymer has a weight average molecular weight of 100 to 5,000 and one functional group. Specifically, the method of the present disclosure is carried out as follows.

First, a plastic crystal matrix electrolyte doped with an ionic salt, a monomer having two or more functional groups, and a linear polymer having a weight average molecular weight of 100 to 5,000 and one functional group are mixed to prepare a solution (step S1).

Alternatively, an ionic salt, a plastic crystal matrix, a linear polymer having a weight average molecular weight of 100 to 5,000 and one functional group, and a monomer having two or more crosslinkable functional groups may be mixed to prepare a solution. In this case, there is no need to prepare the ionic salt-doped plastic crystal matrix electrolyte in advance.

The monomer having two or more crosslinkable functional groups is intended to include not only monomers but also polymers with a low degree of polymerization consisting of 2 to 20 repeating units. The monomer may be selected from above-mentioned monomers. The plastic crystal matrix electrolyte and the ionic salt may also be selected from those mentioned above. The ionic salt may be used in an amount of 0.1 to 3 moles per mole of the plastic crystal matrix.

A solvent may be added during mixing. In this case, drying is additionally needed to remove the solvent. However, the use of the solvent is not necessarily required. A photoinitiator, such as benzoin, may optionally be added to polymerize the monomer.

The solution may further include a linear polymer having no functional group. The linear polymer does not participate in polymerization due to the absence of any functional group and is thus not bonded to the crosslinked structure.

Subsequently, the monomer having two or more functional groups is polymerized in the solution to prepare the solid electrolyte (step S2).

There is no particular restriction on the polymerization method. For example, the monomer may be polymerized by UV irradiation. The presence of two or more functional groups in the monomer allows the polymer to have a three-dimensional crosslinked structure. The linear polymer having a weight average molecular weight of 100 to 5,000 and one functional group is chemically bonded as a side chain to the crosslinked structure through the functional group.

The present disclosure also provides an electrochemical device including a cathode, an anode and the solid electrolyte. The electrochemical device of the present disclosure includes all devices in which electrochemical reactions occur. Specific examples of such devices include all kinds of primary batteries, secondary batteries, fuel cells, solar cells, and capacitors such as supercapacitors. Particularly preferred are lithium secondary batteries, including lithium metal secondary batteries, lithium ion secondary batteries, lithium polymer secondary batteries and lithium ion polymer secondary batteries.

Particularly, the solid electrolyte of the present disclosure is injected into an electrode assembly consisting of a cathode, an anode and a separator interposed between the electrodes to fabricate a lithium secondary battery. The cathode, the anode and the separator constituting the electrode assembly may be those commonly used in the fabrication of lithium secondary batteries. The electrolyte of the present disclosure in the form of a solid may replace the separator.

Each of the cathode and the anode is composed of an electrode current collector and an electrode active material. The cathode active material is preferably a lithium-containing transition metal oxide. Specifically, the cathode active material can be selected from the group consisting of $LiCoO_2$, $LiNiO_2$, $LiMnO_2$, $Li_2Mn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0\leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMin_{2-z}Co_zO_4$ ($0<z<2$), $LiCoPO_4$, $LiFePO_4$, and mixtures thereof. Other examples include sulfides, selenides and halides. As the anode active material, there can be used a carbon material, lithium metal, silicon or tin capable of intercalating/de intercalating lithium ions. A metal oxide whose potential for lithium is less than 2 V, such as $TiO_2$ or $SnO_2$, may also be used as the anode active material. The use of a carbon material is preferred. The carbon material may be one having low crystallinity or high crystallinity. Representative examples of suitable low-crystallinity carbon materials include soft carbon and hard carbon. Examples of suitable high-crystallinity carbon materials include natural graphite, Kish graphite, pyrolytic carbon, mesophase pitch based carbon fiber, meso-carbon microbeads, mesophase pitches, and high-temperature sintered carbon materials, such as petroleum or coal tar pitch derived cokes. The anode may include a binding agent. The binding agent may be selected from various kinds of binder polymers, such as vinylidene fluoride-hexafluoropropylene copolymers (PVDF-co-HFP), polyvinylidene fluoride, polyacrylonitrile and polymethyl methacrylate.

The separator may be a porous polymer film commonly used in the art. Examples of materials for the porous polymer film include polyolefin polymers, such as ethylene homopolymers, propylene homopolymers, ethylene/butane copolymers, ethylene/hexane copolymers and ethylene/methacrylate copolymers. The separator may be a laminate of two or more porous polymer films. The separator may be a porous non-woven fabric. Examples of materials for the porous non-woven fabric include, but are not limited to, high melting-point glass fiber and polyethylene terephthalate fiber.

The shape of the lithium secondary battery according to the present disclosure is not particularly limited. The lithium secondary battery of the present disclosure may have a cylindrical or prismatic shape depending on the shape of a can it employs. The lithium secondary battery of the present disclosure may be of pouch or coin type. A cable type having a linear structure, such as a wire, is also possible.

The present disclosure will be explained in detail with reference to the following examples. However, these examples may be embodied in various different forms and should not be construed as limiting the scope of the present disclosure. The examples are provided to more fully explain the present disclosure to those having ordinary knowledge in the art to which the present disclosure pertains.

EXAMPLES

Example 1

Preparation of PCE/PEGDMA/PEGMA Solid Electrolyte 50 parts by weight of succinonitrile as a plastic crystal electrolyte (PCE), 25 parts by weight of polyethylene glycol dimethacrylate (PEGDMA) having a weight average molecular weight of 400, and 25 parts by weight of polyethylene glycol methacrylate (PEGMA) having a weight average molecular weight of 400 were mixed. To the mixture was added lithium bis(trifluoromethanesulfonyl)imide in such an amount that the molar ratio of the lithium salt to the ethylene oxide units of the PEGDMA and PEGMA was 1:8. After the mixture was homogenized, benzoin as a UV initiator was added thereto in an amount of 3 wt %, based on the total weight of the PEGDMA and PEGMA.

Thereafter, the resulting mixture was cast on a glass plate and irradiated with UV light for 1 min. As a result of the polymerization, an electrolyte was produced in the form of a membrane.

Example 2

Preparation of PCE/PEO/PEGDMA/PEGMA Solid Electrolyte 50 parts by weight of succinonitrile, 25 parts by weight of polyethylene oxide, 12.5 parts by weight of polyethylene glycol dimethacrylate (PEGDMA) having a weight average molecular weight of 400, and 12.5 parts by weight of polyethylene glycol methacrylate (PEGMA) having a weight average molecular weight of 400 were mixed. To the mixture was added lithium bis(trifluoromethanesulfonyl)imide in such an amount that the molar ratio of the lithium salt to the ethylene oxide units of the PEO, PEGDMA and PEGMA was 1:8. After the mixture was homogenized, benzoin as a UV initiator was added thereto in an amount of 3 wt %, based on the total weight of the PEGDMA and PEGMA.

Thereafter, the resulting mixture was cast on a glass plate and irradiated with UV light for 1 min. As a result of the polymerization, an electrolyte was produced in the form of a membrane.

Comparative Example 1

Preparation of Pure Plastic Crystal Matrix Electrolyte

To 100 parts by weight of succinonitrile was added 5 mole % of lithium bis(trifluoromethanesulfonyl)imide, followed by heating to prepare a plastic crystal matrix electrolyte in a pure form.

Comparative Example 2

Preparation of PCE/PEGDMA Solid Electrolyte 50 parts by weight of succinonitrile and 50 parts by weight of polyethylene glycol dimethacrylate (PEGDMA) were mixed. To the mixture was added lithium bis(trifluoromethanesulfonyl)imide in such an amount that the molar ratio of the lithium salt to the ethylene oxide units of the PEGDMA was 1:8. After the mixture was homogenized, benzoin as a UV initiator was added thereto in an amount of 3 wt %, based on the weight of the PEGDMA.

Thereafter, the resulting mixture was cast on a glass plate and irradiated with UV light for 1 min. As a result of the polymerization, an electrolyte was produced in the form of a membrane.

Comparative Example 3

Preparation of PCE/PEO/PEGDMA Solid Electrolyte 50 parts by weight of succinonitrile, 15 parts by weight of polyethylene oxide and 35 parts by weight of polyethylene glycol dimethacrylate (PEGDMA) having a weight average molecular weight of 400 were mixed. To the mixture was added lithium bis(trifluoromethanesulfonyl)imide in such an amount that the molar ratio of the lithium salt to the ethylene oxide units of the PEO and PEGDMA was 1:8. After the mixture was homogenized, benzoin as a UV initiator was added thereto in an amount of 3 wt %, based on the weight of the PEGDMA.

Thereafter, the resulting mixture was cast on a glass plate and irradiated with UV light for 1 min. As a result of the polymerization, an electrolyte was produced in the form of a membrane.

Comparative Examples 4-5

Preparation of PCE/PEO/PEGDMA Solid Electrolytes

Electrolyte membranes were produced in the same manner as in Comparative Example 3, except that succinonitrile, polyethylene oxide and polyethylene glycol dimethacrylate were mixed in different ratios.

In Comparative Example 4, succinonitrile, polyethylene oxide and polyethylene glycol dimethacrylate were mixed in a weight ratio of 50:25:25.

In Comparative Example 5, succinonitrile, polyethylene oxide and polyethylene glycol dimethacrylate were mixed in a weight ratio of 50:35:15.

Test Example 1

Measurement of Ionic Conductivity

Figure 2:
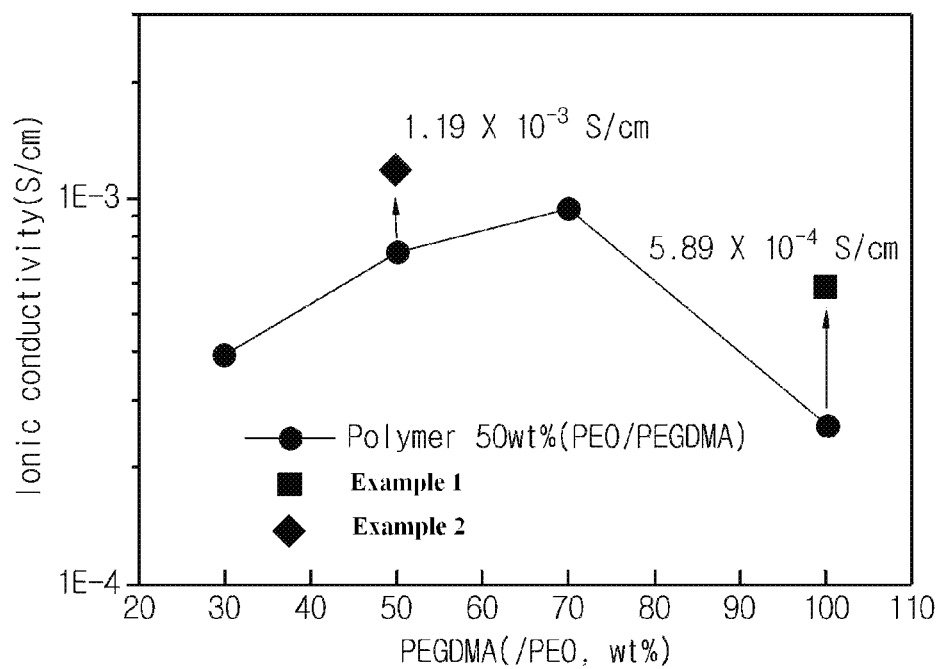
FIG. 2 is a graph showing the ionic conductivities of electrolytes prepared in Examples 1 and 2 and Comparative Examples 2 to 5.

The electrolytes of Examples 1-2 and Comparative Examples 2-5 having different compositions of the crosslinked polymer structures were measured for ionic conductivity. The results are shown in FIG. 2. The ionic conductivities of the electrolytes prepared in Examples 1 and 2 were higher than those of the electrolytes prepared in Comparative Examples 2 and 4, respectively, confirming that the presence of PEGMA in the crosslinked polymer structures led to a marked improvement in ionic conductivity.

The higher ionic conductivities of the electrolytes into which the crosslinked polymer structures including the linear polymer were introduced than the electrolytes into which the crosslinked polymer structures only were introduced are believed to be because the linear polymer chains of the crosslinked structures are structurally flexible while at the same time possessing high mobility in the matrices.

Test Example 2

Measurement of Mechanical Properties

Figure 3:
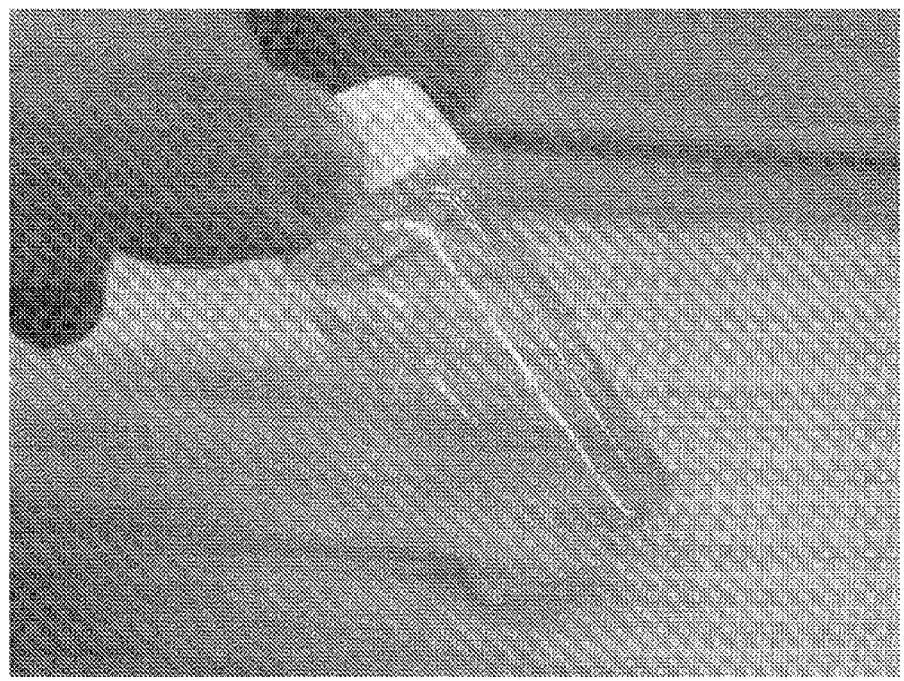
FIG. 3 is a photograph showing the state of an electrolyte prepared in Comparative Example 1.
Figure 4:
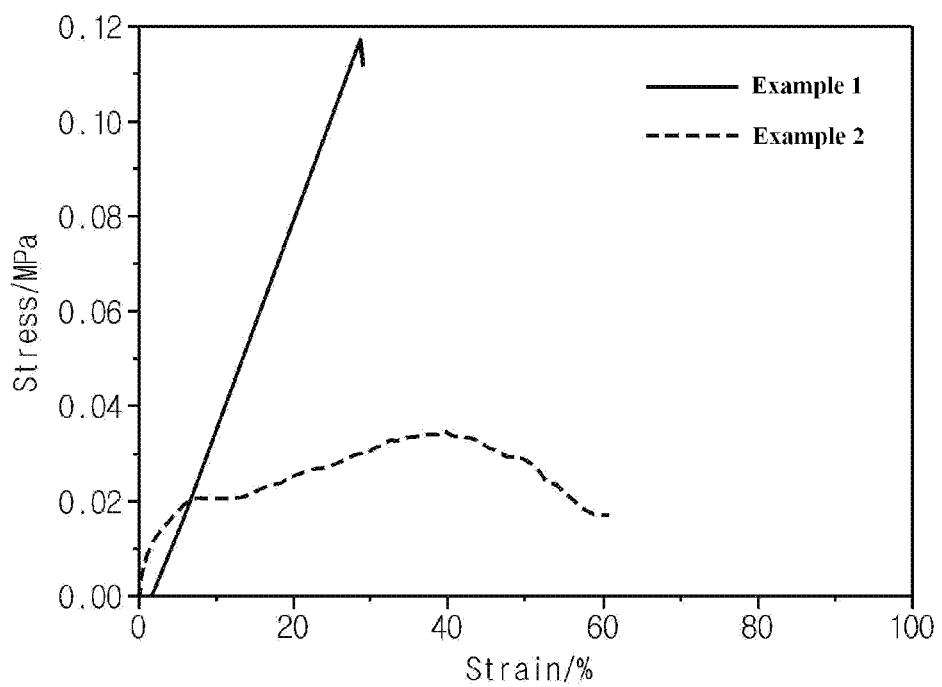
FIG. 4 is a graph showing the tensile strengths of electrolytes prepared in Examples 1 and 2.

The tensile strengths of the electrolytes prepared in Examples 1-2 were measured at a speed of 50 mm/min and the results are shown in FIG. 4. The electrolyte prepared in Comparative Example 1 was incapable of forming a solid film (FIG. 3), revealing its very poor mechanical properties.

The plastic crystal matrix electrolytes in which the crosslinked polymer structure networks were formed showed greatly improved physical properties compared to the pure polymer crystal matrix, suggesting that batteries including the electrolytes have little danger of short circuits and disconnection even when an external force is applied thereto.

What is claimed is:
1. A solid electrolyte for an electrochemical device, comprising a composite of a plastic crystal matrix electrolyte doped with an ionic salt and a crosslinked polymer structure having a linear polymer as a side chain chemically bonded thereto wherein the linear polymer has a weight average molecular weight of 100 to 5,000 and one functional group.

2. The solid electrolyte according to claim 1, wherein the composite further comprises a linear polymer having no functional group.

3. The solid electrolyte according to claim 1, wherein the plastic crystal matrix electrolyte doped with an ionic salt is present in an amount of 40 to 90% by weight.

4. The solid electrolyte according to claim 1, wherein the plastic crystal matrix electrolyte comprises succinonitrile.

5. The solid electrolyte according to claim 1, wherein the ionic salt is a lithium salt.

6. The solid electrolyte according to claim 5, wherein the lithium salt is selected from the group consisting of lithium bis(trifluoromethanesulfonyl)imide, lithium bis(perfluoroethylsulfonyl)imide, lithium tetrafluoroborate, and mixtures thereof.

7. The solid electrolyte according to claim 1, wherein the linear polymer having a weight average molecular weight of 100 to 5,000 and one functional group is selected from the group consisting of polyethylene glycol methacrylate, polyethylene glycol acrylate, polyethylene glycol methyl ether acrylate, polyethylene glycol methyl ether methacrylate, and mixtures thereof.

8. The solid electrolyte according to claim 1, wherein the crosslinked polymer structure is a polymer of a monomer having two or more functional groups.

9. The solid electrolyte according to claim 8, wherein the monomer having two or more functional groups is selected from the group consisting of trimethylolpropane ethoxylate triacrylate, polyethylene glycol dimethacrylate, polyethylene glycol diacrylate, divinyl benzene, polyester dimethacrylate, divinyl ether, trimethylolpropane, trimethylolpropane trimethacrylate, ethoxylated bisphenol A dimethacrylate, and mixtures thereof.

10. The solid electrolyte according to claim 2, wherein the linear polymer having no functional group is selected from the group consisting of polyethylene oxide, polypropylene oxide, polyoxymethylene, polydimethylsiloxane, polyacrylonitrile, polymethyl methacrylate, polyvinyl chloride, polyvinylidene fluoride, polyvinylidene fluoride-co-hexafluoropropylene, polyethyleneimine, poly(p-phenylene terephthalamide), poly(methoxy polyethylene glycol methacrylate), poly(2-methoxyethyl glycidyl ether), and mixtures thereof.

11. The solid electrolyte according to claim 2, wherein the crosslinked polymer structure having a linear polymer having a weight average molecular weight of 100 to 5,000 and one functional group as a side chain chemically bonded thereto is polyethylene glycol dimethacrylate having polyethylene glycol methacrylate as a side chain chemically bonded thereto; and the linear polymer having no functional group is polyethylene oxide.

12. A method for preparing the solid electrolyte for the electrochemical device according to claim 1, the method comprising:
(S1) mixing a plastic crystal matrix electrolyte doped with an ionic salt, a monomer having two or more functional groups, and a linear polymer having a weight average molecular weight of 100 to 5,000 and one functional group to prepare a solution; and
(S2) polymerizing the monomer having two or more functional groups in the solution.

13. The method according to claim 12, wherein the solution in step (S1) further comprises a linear polymer having no functional group.

14. The method according to claim 12, wherein the plastic crystal matrix electrolyte comprises succinonitrile.

15. The method according to claim 12, wherein the ionic salt is present in an amount of 0.1 to 3 moles per mole of the plastic crystal matrix electrolyte.

16. The method according to claim 12, wherein the ionic salt is a lithium salt.

17. The method according to claim 16, wherein the lithium salt is selected from the group consisting of lithium bis(trifluoromethanesulfonyl)imide, lithium bis(perfluoroethylsulfonyl)imide, lithium tetrafluoroborate, and mixtures thereof.

18. The method according to claim 12, wherein the monomer having two or more functional groups is selected from the group consisting of trimethylolpropane ethoxylate triacrylate, polyethylene glycol dimethacrylate, polyethylene glycol diacrylate, divinyl benzene, polyester dimethacrylate, divinyl ether, trimethylolpropane, trimethylolpropane trimethacrylate, ethoxylated bisphenol A dimethacrylate, and mixtures thereof.

19. The method according to claim 12, wherein the linear polymer having a weight average molecular weight of 100 to 5,000 and one functional group is selected from the group consisting of polyethylene glycol methacrylate, polyethylene glycol acrylate, polyethylene glycol methyl ether acrylate, polyethylene glycol methyl ether methacrylate, and mixtures thereof.

20. The method according to claim 13, wherein the linear polymer having no functional group is selected from the group consisting of polyethylene oxide, polypropylene oxide, polyoxymethylene, polydimethylsiloxane, polyacrylonitrile, polymethyl methacrylate, polyvinyl chloride, polyvinylidene fluoride, polyvinylidene fluoride-co-hexafluoropropylene, polyethyleneimine, poly(p-phenylene terephthalamide), poly (methoxy polyethylene glycol methacrylate), poly(2-methoxyethyl glycidyl ether), and mixtures thereof.

21. An electrochemical device comprising a cathode, an anode and an electrolyte wherein the electrolyte is a solid electrolyte according to claim 1.

22. The electrochemical device according to claim 21, wherein the electrochemical device is a lithium secondary battery.

* * * * *